(12) United States Patent
Plant et al.

(10) Patent No.: US 8,647,042 B2
(45) Date of Patent: Feb. 11, 2014

(54) GLASS CUTTING LINE WITH INTEGRAL OFFAL STORAGE AND RETRIEVAL SYSTEM AND METHOD

(75) Inventors: Phillip David Plant, Butler, PA (US); Aron Martino, Zelienople, PA (US)

(73) Assignee: Billco Manufacturing Incorporated, Zelienople, PA (US)

( * ) Notice: Subject to any disclaimer, the term of this patent is extended or adjusted under 35 U.S.C. 154(b) by 801 days.

(21) Appl. No.: 12/503,824

(22) Filed: Jul. 15, 2009

(65) Prior Publication Data
US 2010/0011935 A1 Jan. 21, 2010

Related U.S. Application Data

(60) Provisional application No. 61/081,032, filed on Jul. 15, 2008.

(51) Int. Cl.
*B65G 49/06* (2006.01)
*C03B 33/03* (2006.01)

(52) U.S. Cl.
USPC ............ 414/416.07; 414/331.09; 414/331.14; 65/433; 225/96.5

(58) Field of Classification Search
USPC .............. 225/2, 3, 4, 93, 94, 96, 97, 98, 96.5; 83/94; 312/34.1; 206/454, 449; 414/331.14, 278, 281, 282, 283, 414/416.07, 331.09; 211/41.14, 59.2, 59.3, 211/59.4, 49.1; 65/433
See application file for complete search history.

(56) References Cited

U.S. PATENT DOCUMENTS

| | | | |
|---|---|---|---|
| 3,668,955 A * | 6/1972 | Rupprecht et al. | 83/879 |
| 4,750,854 A * | 6/1988 | Pascale et al. | 414/798.5 |
| 5,791,971 A | 8/1998 | Dickinson et al. | |
| 6,463,762 B1 * | 10/2002 | Ross, Jr. | 65/105 |
| 6,681,916 B2 * | 1/2004 | Hiroki | 198/347.1 |
| 6,810,784 B1 | 11/2004 | Cunningham | |
| 7,217,077 B2 | 5/2007 | Mercure | |
| 7,255,253 B2 * | 8/2007 | Wirsam | 225/2 |
| 7,708,515 B2 * | 5/2010 | Yoon | 414/416.07 |
| 7,866,185 B2 * | 1/2011 | Adriaansen et al. | 65/158 |
| 2005/0105992 A1 * | 5/2005 | An et al. | 414/280 |
| 2008/0110205 A1 * | 5/2008 | Adriaansen et al. | 65/29.12 |

* cited by examiner

*Primary Examiner* — Laura M Lee
(74) *Attorney, Agent, or Firm* — Blynn L. Shideler; Krisanne Shideler; BLK Law Group

(57) ABSTRACT

A glass cutting line includes a cutting table having a movable cutting head cutting glass work pieces on the table and a conveyor for moving glass work pieces onto and off of the cutting table The line includes a loader adjacent the cutting table having a loader table, a loader table conveyor, and a table loader unit receiving and delivering glass work pieces to the loader table. The loader table conveyor transports the glass work pieces to the cutting table. The line includes a cassette work piece storage and retrieval unit positioned vertically below the loader table when the loader table is positioned to transport the glass work pieces to the cutting table. The cassette work piece storage and retrieval unit receives work pieces from the cutting table and delivers work pieces to the cutting table from any of a plurality of storage locations.

19 Claims, 6 Drawing Sheets

US 8,647,042 B2

GLASS CUTTING LINE WITH INTEGRAL OFFAL STORAGE AND RETRIEVAL SYSTEM AND METHOD

RELATED APPLICATIONS

The present application claims the benefit of provisional patent application Ser. No. 61/081,032 filed Jul. 15, 2008 entitled "Glass Cutting Line with Integral Offal Storage and Retrieval System."

BACKGROUND OF THE INVENTION

1. Field of the Invention

The present invention relates to glass processing equipment. Specifically, the invention relates to a glass cutting line having integral offal storage and retrieval system.

2. Background Information

Glass processing equipment includes glass cutting lines. Glass cutting lines are well known in the industry and some typically critical components of a glass cutting line includes a cutting table having a movable cutting head (such as though an XY positioning system) configured to cut glass work pieces on the table. Glass cutting tables are available from the assignee of this invention, Billco Manufacturing, Inc. (Billco) and others. Examples of glass cutting lines are described in U.S. Pat. Nos. 5,791,971, 6,463,762 and 6,810,784, which are incorporated herein by reference.

Within the meaning of this application glass cutting table is a glass processing apparatus that is configured to score or cut glass work pieces according to predefined patterns. The cutting patterns are generally prepared by a glass optimizing system, such as developed by Billco and available from HP3 Software under the Batch Ban® trademark. An XY cutting head is a glass cutting or scoring device, e.g. cutting wheel, which is movable within the XY plane to cut the work piece, typically by having a bridge extend across the table for movement along one axis and a carriage moveable along the bridge in the second axis. The cutting head generally can also move into and out of engagement with the work piece along a third (z) axis, and are generally numerically controlled according to the predetermined cutting pattern. It is possible, but less common, to have a glass cutting head moveable only across the table (the X or Y direction, depending on the orientation), but such a cutter is less common.

It is common to have a feeding table in front of the cutting table of a cutting line and a break out table adjacent the cutting table. One common feeding table is a tilt feeder. A tilt feeder generally includes a tilt loader table, a tilt loader table conveyor, and a pivoting tilt loader. The pivoting tilt loader receives glass work pieces, such as from a gantry crane from a variety of glass storage racks. The pivoting tilt loader will typically receive the work pieces in a generally vertical orientation and delivers the glass work pieces to the tilt loader table in a general horizontal orientation, whereby the tilt loader table conveyor transports the glass work pieces to the cutting table. It has been known, and is generally common, to place the entire tilt feeder on tracks to move the feeder toward where the work pieces can be loaded onto the feeder. Other feeder tables are known in the art other than a tilt loader.

Glass work pieces within the meaning of this application references all glass work pieces throughout the glass processing process, including stock lites, individual cut pieces and remnant or offal pieces, also called offcuts. Offal glass work pieces are generally referencing the portion of a stock lite or sheet that remains after cutting one or more work pieces there from, wherein the remnant is large enough to meaningfully obtain future needed work pieces there from, whereby it is efficient to store the remnant for future use rather than scrap the unused portion. The offal is, effectively, a cut remnant that is too large to scrap. The term "offal" here is borrowed from the butchery arts, where it has a different, but somewhat analogous meaning.

Optimization Software Systems for glass cutting generally produce random size offal, offcut or remnant pieces (also referred scrap glass), at various times during the optimization process. These large offal pieces may be discarded immediately, or re-used on a future cutting layout. Historically, the problem with re-using the remnant pieces is where to store them until the Optimization software determines an appropriate cut piece layout for each offal size. Manual racking and re-loading of the offal pieces takes time, requires storage space, and is prone to glass scratching during handling.

When an offal piece is generated, special handling is required on many glass types to avoid destroying the offal piece. Manual handling may be inefficient and inappropriate for many glass types. In view of these restrictions several offal storage and retrieval systems have been proposed in the art.

Many of these offal storage and retrieval systems require significant modifications to the cutting line by placing a separate offal handler and a separate work piece storage and retrieval device. The storage devices can be a "cassette type" storage device. A cassette type storage device can be defines herein as a storage device which receives work pieces from the handler and delivers work pieces to the handler from any of a plurality of storage locations within the cassette device. The control system will designate a storage location for a particular stored piece so the offal work piece can be recalled later when needed.

See for example U.S. Pat. No. 7,217,077 which discloses a separate storage system for use next to a glass processing line having a loading table, a glass cutting table and a breakout table. The storage system comprises a first tilt table and a second tilt table. A cassette storage rack is positioned between the first and the second tilt tables. The storage rack comprises a plurality of parallel storage slots extending longitudinally within the main frame of the storage rack. The storage slots stores the glass offcuts at a substantially vertical position of less than 90 degrees with reference to the horizontal. In use, the first tilt table receives horizontally-disposed glass offcuts from the breakout table and sends it to the storage rack. The second tilt table receives previously-stored glass offcuts from the storage rack to be directed to the loading table. This system has been commercialized by Bromer, Inc.

The difficulty with the existing offcut, offal or remnant handling systems is that there is not always room to expand the glass cutting line to incorporate the system. Further, the existing systems increase the time for offal handling considerable which results in decreasing the overall efficiencies of the cutting line. In a glass cutting line the reduction of scrap can greatly improve yield and production, and the decrease in production time can also increase production. There always remains a need to improve these two characteristics of any glass cutting line.

SUMMARY OF THE INVENTION

The above objects are achieved with the embodiments according to this invention, which in one non-limiting embodiment of the present invention provides a glass cutting line which includes a cutting table having a movable cutting head configured to cut glass work pieces on the table, and a conveyor for moving glass work pieces onto and off of the cutting table; a loader adjacent the cutting table having a loader table, a loader table conveyor, and a table loader unit configured to receive and deliver glass work pieces to the loader table whereby the loader table conveyor is configured to transport the glass work pieces to the cutting table; and a cassette work piece storage and retrieval unit positioned vertically below the loader table when the loader table is positioned to allow the loader table conveyer to transport the glass work pieces to the cutting table, wherein the cassette work piece storage and retrieval unit is configured to receive work pieces from the cutting table and to deliver work pieces to the cutting table from any of a plurality of storage locations.

The glass cutting line according to the invention may further include a breaking bar associated with the cassette work piece storage and retrieval unit, wherein the breaking bar is configured to breakout a work piece that is at least partially received within one of the plurality of storage locations of the cassette work piece storage and retrieval unit.

The glass cutting line according to the invention may provide that the cassette work piece storage and retrieval unit is configured to receive work pieces directly from the cutting table conveyor and to deliver work pieces directly to the cutting table conveyor from any of a plurality of storage locations.

The glass cutting line according to the invention may further include a breakout table adjacent the cutting table and configured to receive work pieces from the cutting table conveyor.

The glass cutting line according to the invention may further provide that the cassette work piece storage and retrieval unit has substantially horizontal storage locations and wherein the unit is vertically moveable to align a selected storage location with the cutting table.

The glass cutting line according to the invention may further provide that the cassette work piece storage and retrieval unit is configured to receive work pieces from the cutting table and to deliver work pieces to the cutting table from any of a plurality of storage locations simultaneously with the table loader unit, which may be a pivoting tilt loader, receiving glass work pieces.

Within the meaning of this application a glass production line references a glass work piece processing line in which glass work pieces are altered, such as for the construction of IG windows and doors and the like.

Within the meaning of this application a glass cutting table, or cutting table, is a glass processing unit that is designed to cut or score glass sheets into individual glass work pieces, sometimes called lites. The scored glass sheets will typically be separated into individual glass work pieces for subsequent processing, and into scrap elements for recycling, on a break out table. The break out table may be manual or automatic. The break out table may be considered as the last part of the cutting table for this application.

Within the meaning of this application a cutting schedule is the production schedule for the cutting table to follow. The cutting schedule will identify which sheet of glass is to be cut and what glass work pieces are to be formed from the sheet. The location of the individual glass work pieces on the sheet is also generally noted along with break out order and storage location (i.e. storage rack and slot position).

The particular advantages of the present invention will be described in connection with the attached figures wherein like reference numerals represent like elements throughout.

BRIEF DESCRIPTION OF THE DRAWINGS

Other objects and advantages appear in the following description and claims. The enclosed drawing illustrates one practical embodiment of the present invention, without intending to limit the scope of the invention or the included claims.

DESCRIPTION OF THE PREFERRED EMBODIMENTS

Figure 1:
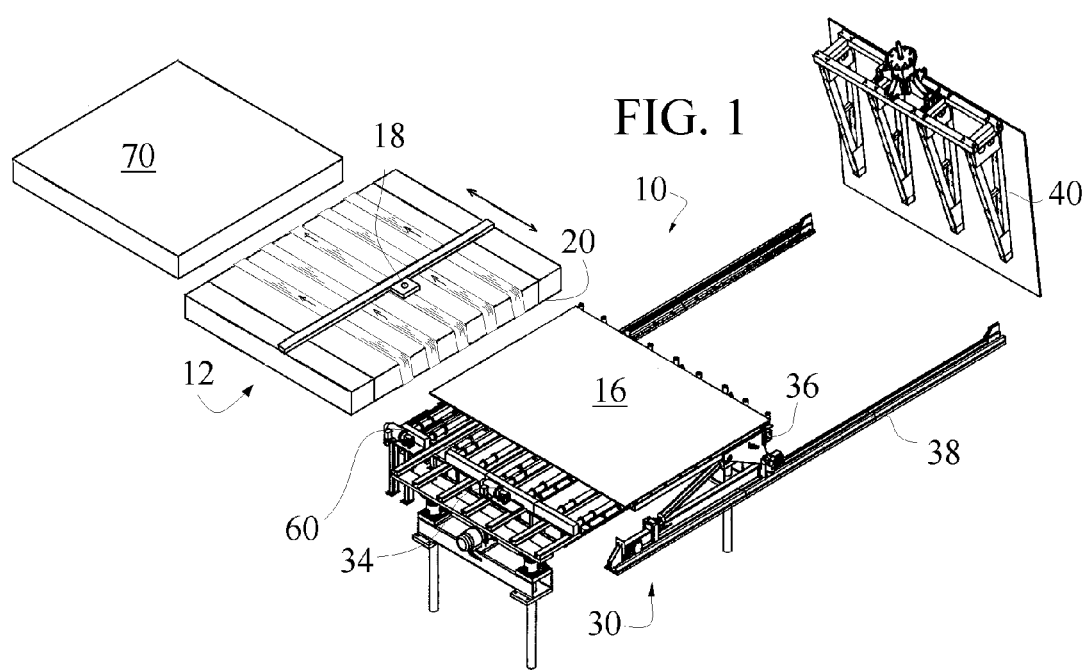
FIG. 1 is a schematic view of a cutting line according to one embodiment of the present invention.
Figure 2A:
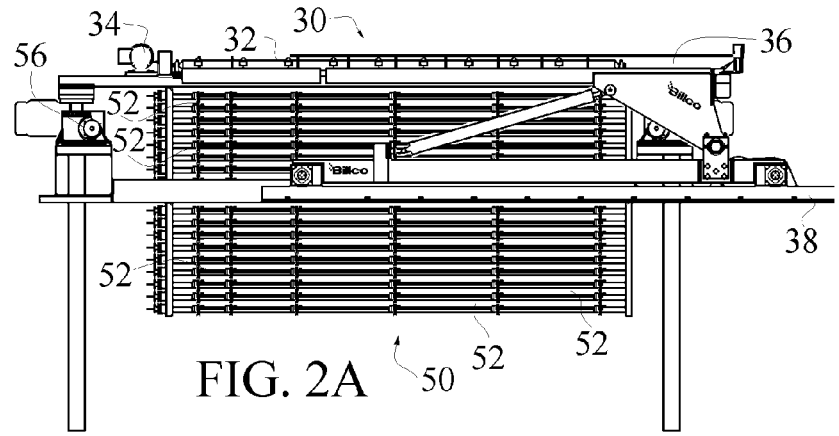
FIG. 2A is an elevation side view of an integrated tilt loader and cassette offal storage and retrieval system in accordance with one aspect of the present invention, with a pivoting tilt loader in position having delivered a glass work piece to a loader table.
Figure 2B:
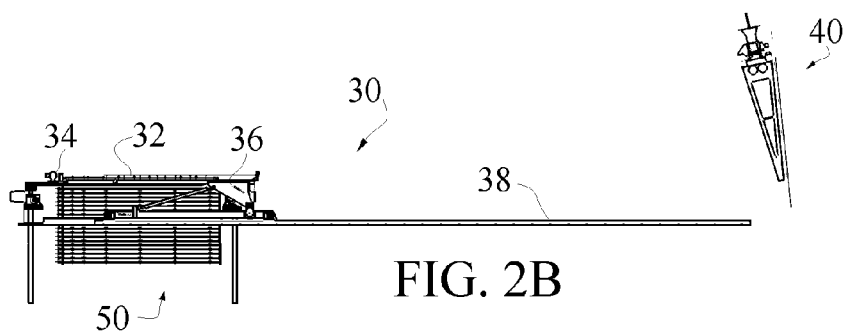
FIG. 2B is an enlarged side elevation of the integrated tilt loader and cassette offal storage and retrieval system of FIG. 2A.
Figure 3A:
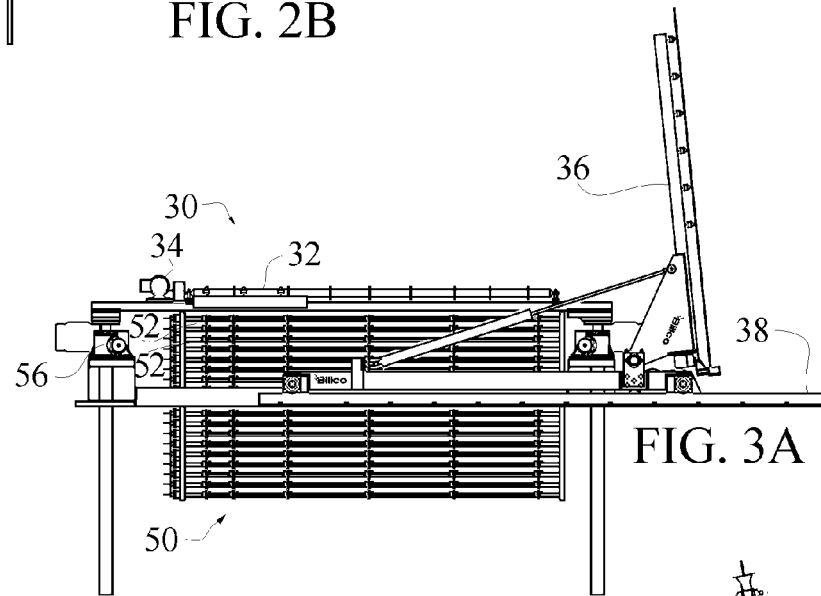
FIG. 3A is an enlarged elevation side view of an integrated tilt loader and cassette offal storage and retrieval system in accordance with one aspect of the present invention, with the pivoting tilt loader in the glass conveying position.
Figure 3B:
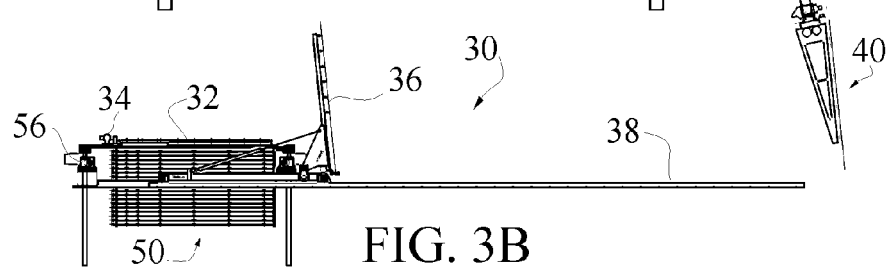
FIG. 3B is a side elevation of the integrated tilt loader and cassette offal storage and retrieval system of FIG. 3A.
Figure 4:
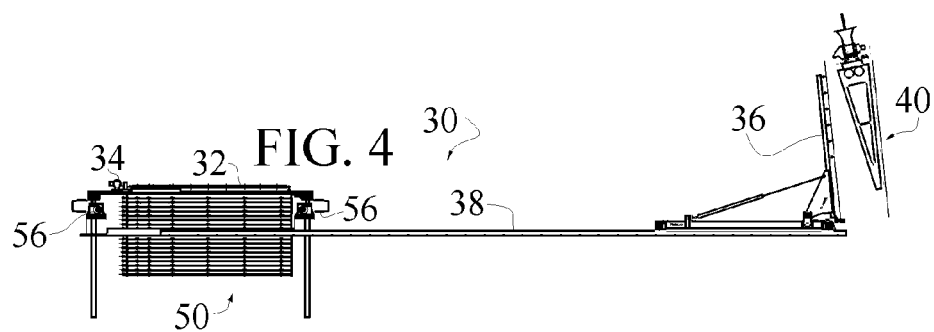
FIG. 4 is an elevation side view of an integrated tilt loader and cassette offal storage and retrieval system in accordance with one aspect of the present invention, with the pivoting tilt loader in the glass conveying position at a glass storage location.
Figure 6A:
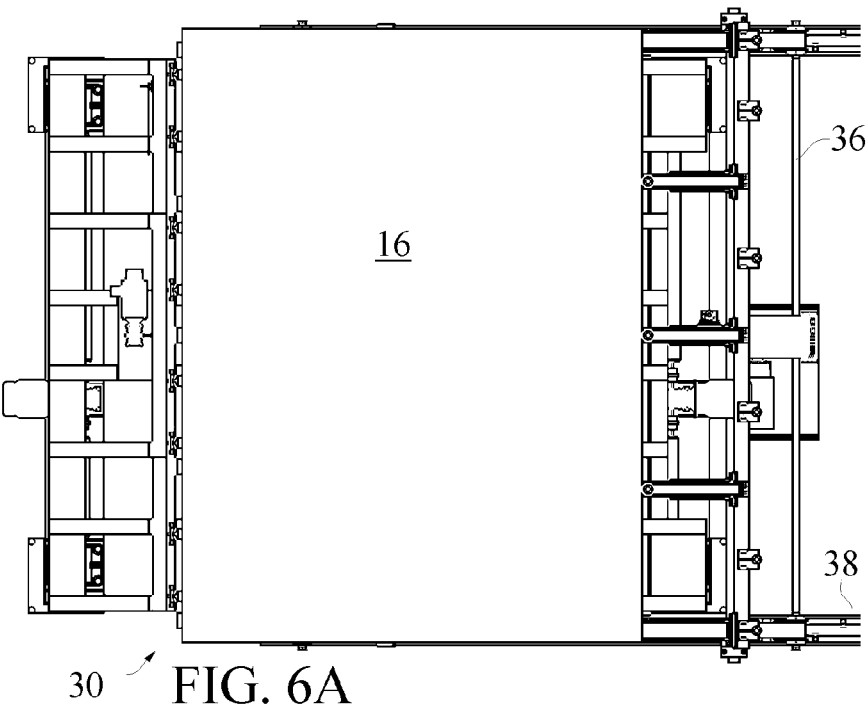
FIG. 6A is a top plan view of the integrated tilt loader and cassette offal storage and retrieval system in accordance with one aspect of the present invention, with the pivoting tilt loader in position having delivered a glass work piece to the loader table.
Figure 6B:
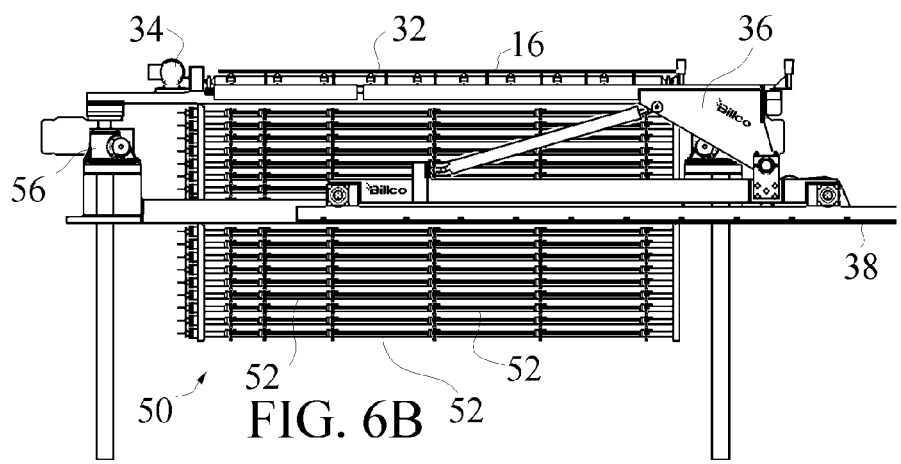
FIG. 6B is an elevation side view of the integrated tilt loader and cassette offal storage and retrieval system in accordance with one aspect of the present invention, with the pivoting tilt loader in position having delivered a glass work piece to the loader table.
Figure 5A:
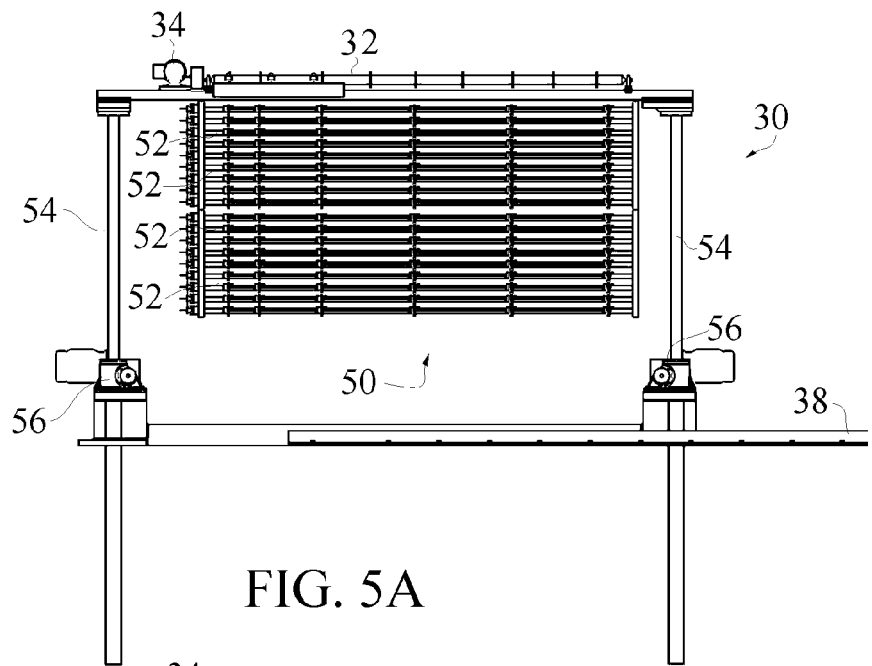
FIG. 5A is an enlarged elevation side view of an integrated tilt loader and cassette offal storage and retrieval system in accordance with one aspect of the present invention, with the storage and retrieval system in the glass offal receiving or conveying position.
Figure 5B:
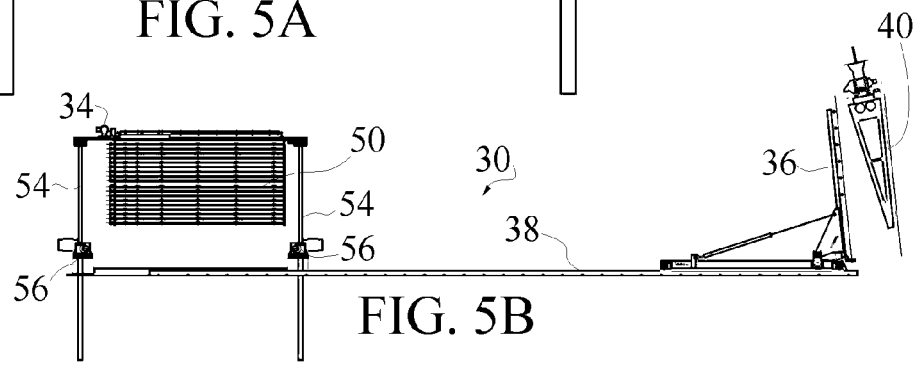
FIG. 5B is a elevation side view of an integrated tilt loader and cassette offal storage and retrieval system in accordance with one aspect of the present invention, with the storage and retrieval system in the glass offal receiving or conveying position and with the pivoting tilt loader in the glass conveying position at a glass storage location.
Figure 5C:
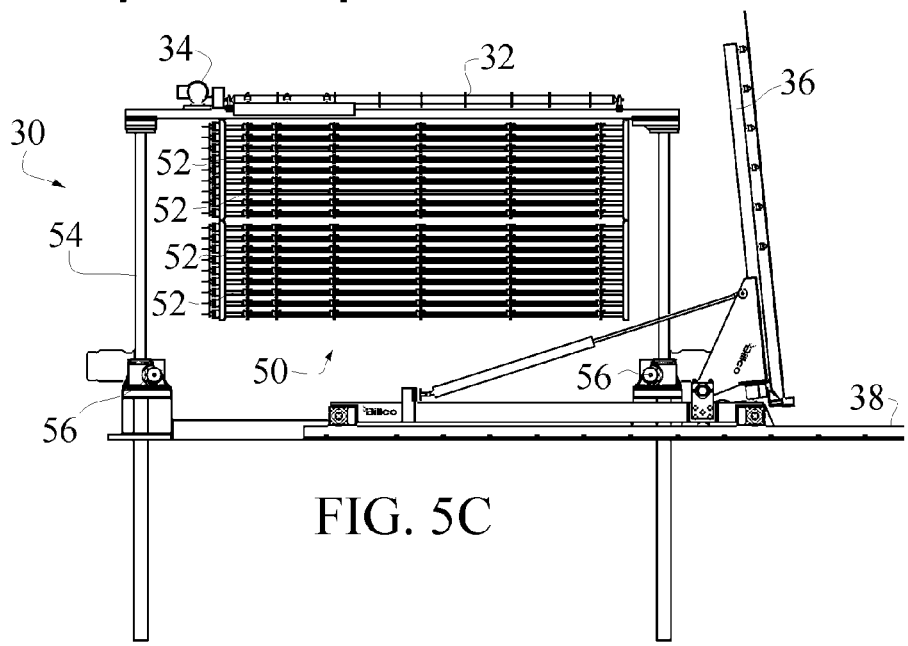
FIG. 5C is a elevation side view of an integrated tilt loader and cassette offal storage and retrieval system in accordance with one aspect of the present invention, with the storage and retrieval system in the glass offal receiving or conveying position and with the pivoting tilt loader in the glass conveying position.
Figure 7:
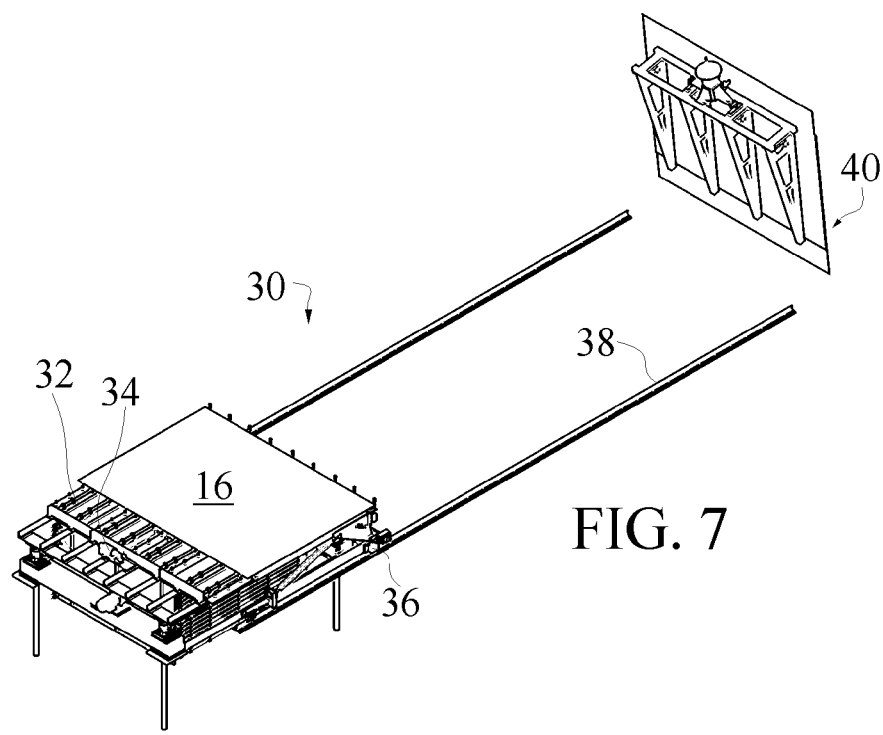
FIG. 7 is an elevation perspective view of the integrated tilt loader and cassette offal storage and retrieval system in accordance with one aspect of the present invention, with the pivoting tilt loader in position having delivered a glass work piece to the loader table.
Figure 8:
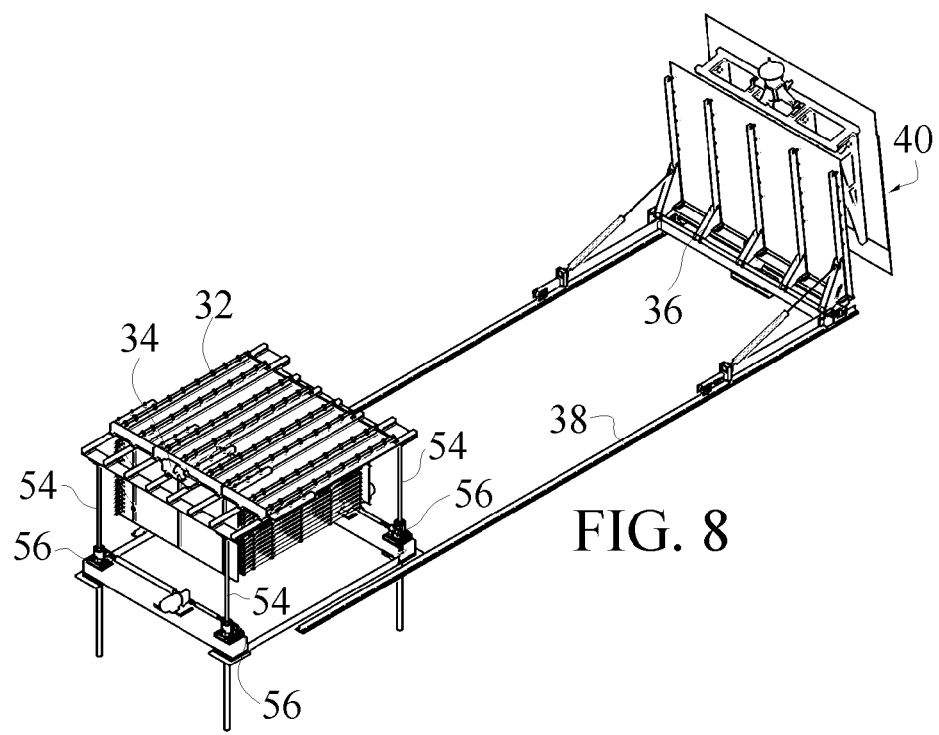
FIG. 8 is an elevation perspective view of the integrated tilt loader and cassette offal storage and retrieval system in accordance with one aspect of the present invention, with the storage and retrieval system in the glass offal receiving or conveying position and with the pivoting tilt loader in the glass conveying position.
Figure 10:
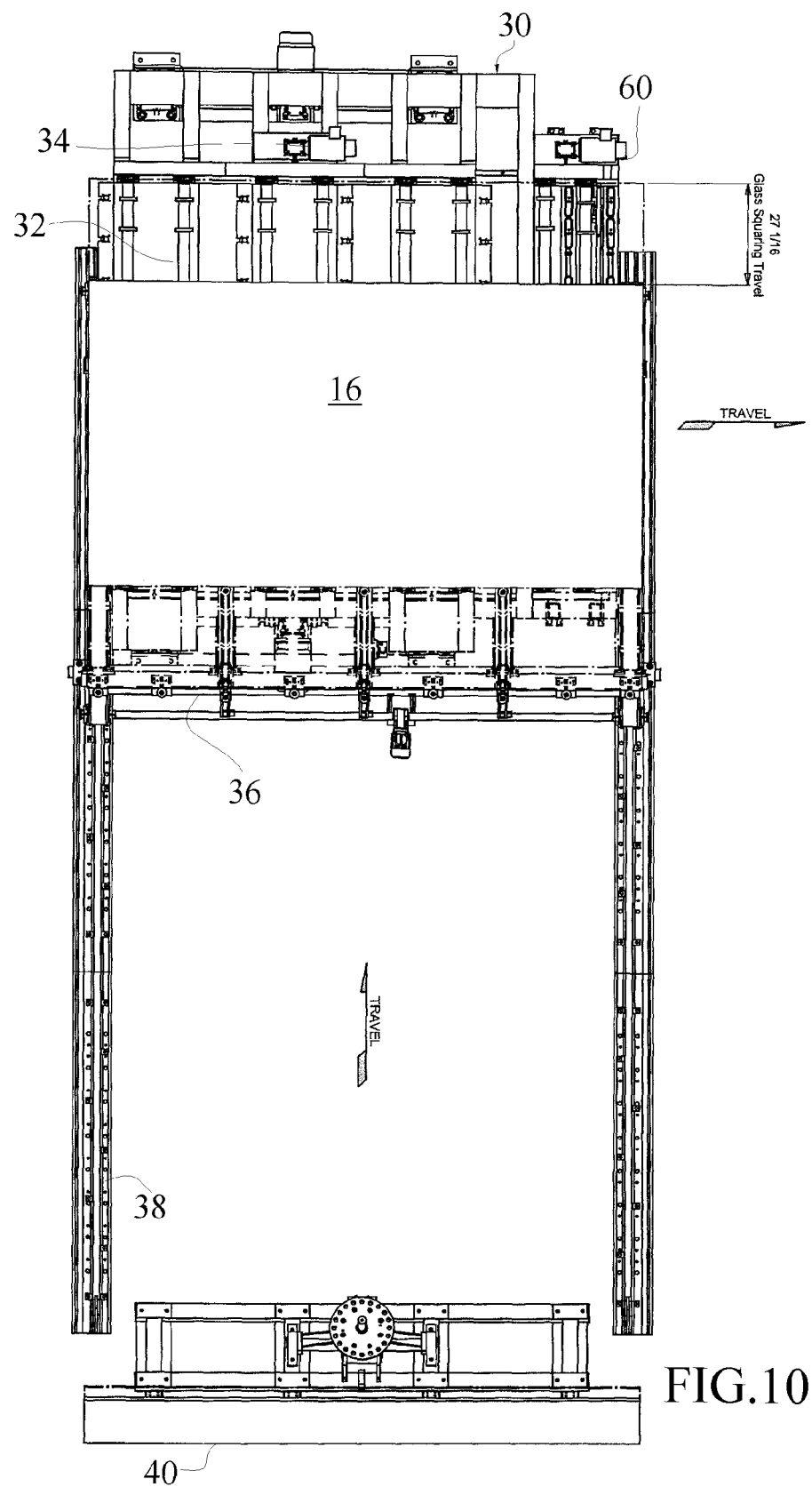
FIG. 10 is a top plan view of the integrated tilt loader and cassette offal storage and retrieval system in accordance with one aspect of the present invention, including a breaking bar integral with the system

FIG. 1 schematically illustrates a glass product cutting line 10 according to the present invention. One central component of the cutting line 10 is a computer controlled of CNC glass cutting table 12 for cutting sheets of glass into cut glass work pieces 16. The cutting table 12 itself is well known in the art, such as those sold by Billco Manufacturing, Inc. The table 12 generally includes a cutting or scoring head 18 mounted on a carriage which, in turn, is mounted on a bridge over the table surface. The bridge carries a track along which the carriage moves, and the bridge, in turn, is moved along tracks adjacent the table. The carriage and bridge form an X-Y positioning system for the cutting or scoring head 18. The present invention could be utilized with cutting tables 12 having only an X or Y movement, but greater efficiencies are believed to be achieved with the X-Y positioning system on the cutting table 12.

The glass cutting table has an XY movable cutting head 18 configured to cut glass work pieces 16 on the table 12, and a conveyor 20 for moving glass work pieces 16 onto and off of the cutting table 12. Other aspects of the table 12, such as work piece squaring, positioning and locating can be included as known in the art. The top of the cutting table 12 will typically define what is known as a pass line in the art. The pass line is the horizontal plane that the work pieces are conveyed throughout the operational process of glass production on the cutting table 12. As will be evident, the storage and retrieval system of the present invention will take work pieces out of and return them back to the pass line.

The cutting line 10 includes a loader, namely a tilt loader 30, adjacent the cutting table 12 having a tilt loader table 32, a tilt loader table conveyor 34, and a pivoting tilt loader 36. The table 32 is effectively formed by the top of the conveying elements forming the conveyor 34. The conveying elements themselves are conventional and the conveyor is noted in the drawings by reference to the conveyor motor. The tilt loader 36 is configured move along tracks 38 to receive glass work pieces or sheets 16 from a storage location 40 and deliver the sheets 16 to the tilt loader table 32 whereby the tilt loader table conveyor 34 is configured to transport the glass work pieces 14 to the cutting table 12 along the pass line.

The Tilt Loader 36 receives stock lites of glass from a vertical, Vacuum Glass Grab of the storage location 40. The Grab is attached to the glass retrieval crane that is operating in the multiple rack, stock glass storage area 40. The Tilting Loader 36 arms rotate the glass from the vertical to a horizontal position onto the table 32; and then the conveoyer 34 conveys the glass forward to the glass cutting machine conveyor 20, when the table 32 is aligned with the pass line.

The cutting line 10 includes a cassette work piece storage and retrieval unit 50 positioned vertically below the tilt loader table 32 when the tilt loader table 32 is positioned to allow the tilt loader table conveyer 34 to transport the glass work pieces 14 to the cutting table 12.

The cassette work piece storage and retrieval unit 50 is configured through posts 54 moveable by motors 56 to receive work pieces 16 from the cutting table 12 and to deliver work pieces 16, namely offal pieces to the cutting table 12 from any of a plurality of storage locations 52. The motors 36 will align the designated storage location 52 with the pass line. A pick and place actuator can be used to move pieces into and out of the storage location 52 or shelf, although other movement mechanisms can be used.

Figure 9:
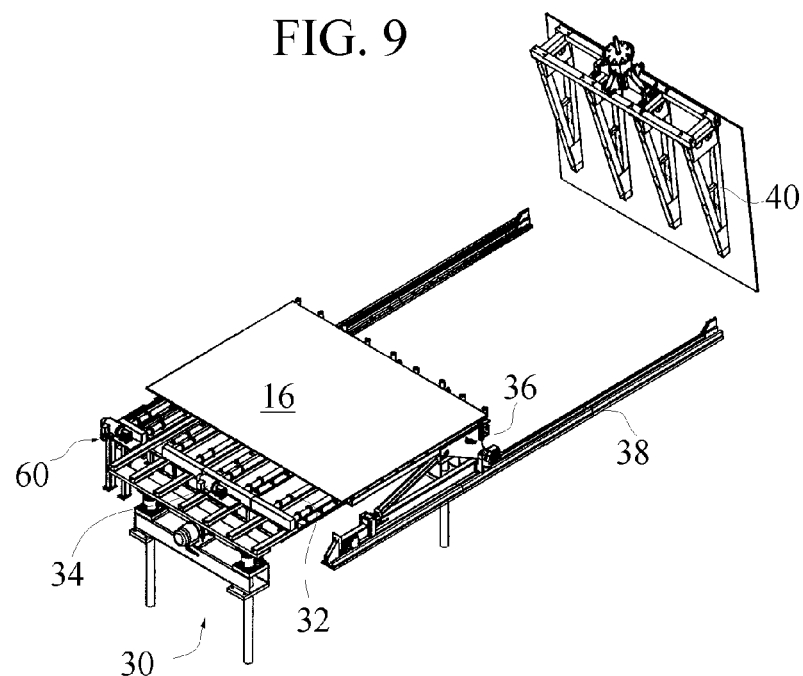
FIG. 9 is an elevation perspective view of the integrated tilt loader and cassette offal storage and retrieval system in accordance with one aspect of the present invention, including a breaking bar integral with the system.

The glass cutting line 10 according to the invention may further include a breaking bar unit 60, shown in FIGS. 1 and 9 associated with the cassette work piece storage and retrieval unit 50. The breaking bar unit 60 is configured to breakout a work piece 16 that had been scored on the table 12 and that is at least partially received within one of the plurality of storage locations 52 of the cassette work piece storage and retrieval unit 50. The breaking bar component can also assist in placing work pieces into and out of the desired storage location 52 as this unit remains at the pass line. The construction of a breaking bar unit, itself, is known in the art and generally includes an elevating portion to lift a work piece allowing the work piece to break or fracture along a score line place in the work piece. In this configuration, after scoring on the cutting machine 12, this system retrieves and separates the remnant piece from the remaining stock lite; stores the remnant; and then retrieves the remnant when the Glass Optimization Software calls for it at the cutting machine.

With the break out bar or unit 60, the system 50 can be considered or more easily be described to be comprised of the Breakout System 60 for automatic score separation and the Stack of Shelves 52 located under the pass line of the Tilt Loader during the normal stock lite loading process. This Shelf Stack 52 has the capability to raise during the remnant retrieval process.

The glass cutting line 10 according to the invention provides that the cassette work piece storage and retrieval unit 50 is configured to receive work pieces 16 directly from the cutting table conveyor 20 and to deliver work pieces 16 directly to the cutting table conveyor 20 from any of a plurality of storage locations 52. The remnant storage operates as follows: The control system recognizes the situation when the Glass Optimization Software creates a cutting layout that includes a remnant piece (i.e. a piece larger than pre-set dimensions—so as to be reasonably useful for future applications—it should be noted that the pre-set dimensions defining a remnant piece may vary with glass type). The remnant piece will always be located on the trailing edge of the cut layout. The cutting table 12 places a separating score on the glass, so that the remnant piece can be separated from the remaining stock lite. The conveyor control system will track this score. The scored stock lite is reversed on the conveyor 20 until the score is aligned in the Breakout System 60, and the score is separated automatically. During the above process, the Tilt Loader 36 raises and goes to a hold mode or can be sent to retrieve the next work piece from the storage location 40. The Stack of Shelves 52 then raises through motors 56 until a designated empty shelf is aligned with the cutting machine conveyor pass line. The remnant is automatically placed into the empty shelf by a pick and place actuator. The remaining stock lite is conveyed back to the cutting machine for further scoring. The Stack of Shelves lowers and the Tilt Loader resumes operation. When the Glass Optimization Software determines that it can use one of the remnant pieces that are stored in Stack of Shelves, the process is repeated to retrieve the piece.

The glass cutting line 10 according to the invention may further include a breakout table 70 adjacent the cutting table 12 and configured to receive work pieces 16 from the cutting table conveyor 20.

The glass cutting line 10 according to the invention may further provide that the cassette work piece storage and retrieval unit 50 has substantially horizontal storage locations 52 and wherein the unit is vertically moveable to align a selected storage location 52 with the cutting table 12.

The glass cutting line 10 according to the invention may further provide that the cassette work piece storage and retrieval unit 50 is configured to receive work pieces 16 from the cutting table 12 and to deliver work pieces 16 to the cutting table 12 from any of a plurality of storage locations 52 simultaneously with the pivoting tilt loader 32 receiving glass work pieces 16.

The present offal Storage and Retrieval System provides for automatic storage of the remnant pieces during the glass cutting process. Remnant pieces are automatically identified by the Optimization software, separated from the stock lite of glass, and then stored on shelves or locations 52, all within the confines of the cutting line. When the Optimization software identifies the need for a particular size stored remnant piece, the Remnant storage and retrieval System of the present invention automatically retrieves the stored piece and conveys it to the cutting table.

As the unit 50 of the present invention is effectively integrated into the tilt loader of the glass cutting line 10, the large stock lites of glass are continuously retrieved from the storage 40 or Crane Retrieval System during the cutting process, and this action can be performed while a remnant 16 is stored into or retrieved from the storage location 52. Therefore, the Remnant Storage/Retrieval System with integrated Tilt Loading Conveyor System serves a dual function during the glass cutting process. This integrated system takes the place of the existing Tilting Loader, therefore no additional external floor space is required.

Studies have shown that the use of remnants in optimized cutting provide increases in glass yields, however the more significant savings are in the lower number of stock glass lites used per optimized run. Actual yields will vary daily, depending upon quantities and order mix of glass pieces to be cut.

Although the present invention has been described with particularity herein, the scope of the present invention is not limited to the specific embodiments disclosed. It will be apparent to those of ordinary skill in the art that various modifications may be made to the present invention without departing from the spirit and scope thereof. The scope of the invention is not to be limited by the illustrative examples described above. The scope of the present invention is defined by the appended claims and equivalents thereto.

What is claimed is:

1. A glass cutting line comprising:
    a cutting table having a movable cutting head configured to cut glass work pieces on the table, and a conveyor for moving glass work pieces onto and off of the cutting table;
    a loader adjacent the cutting table having a loader table, a loader table conveyor, and a table loader unit configured to receive and deliver glass work pieces to the loader table whereby the loader table conveyor is configured to transport the glass work pieces to the cutting table; and
    a cassette work piece storage and retrieval unit positioned vertically below the loader table when the loader table is positioned to allow the loader table conveyer to transport the glass work pieces to the cutting table, wherein the cassette work piece storage and retrieval unit is configured to receive and to deliver work pieces to the cutting line from any of a plurality of storage locations.

2. The glass cutting line according to claim 1 further including a breaking bar associated with the cassette work piece storage and retrieval unit, wherein the breaking bar is configured to breakout a work piece that is at least partially received within one of the plurality of storage locations of the cassette work piece storage and retrieval unit.

3. The glass cutting line according to claim 1 wherein the loader table is a tilt loader table with a pivoting tilt loader.

4. The glass cutting line according to claim 1 further including a breakout table adjacent the cutting table and configured to receive work pieces from the cutting table conveyor.

5. The glass cutting line according to claim 1 wherein the cassette work piece storage and retrieval unit has substantially horizontal storage locations and wherein the unit is vertically moveable to align a selected storage location with the cutting table.

6. The glass cutting line according to claim 1 wherein table loader unit is a pivoting tilt loader, and wherein the cassette work piece storage and retrieval unit is configured to receive work pieces from the cutting table and to deliver work pieces to the cutting table from any of a plurality of storage locations simultaneously with the pivoting tilt loader receiving glass work pieces.

7. The glass cutting line according to claim 6 further including a breaking bar associated with the cassette work piece storage and retrieval unit, wherein the breaking bar is configured to breakout a work piece that is at least partially received within one of the plurality of storage locations of the cassette work piece storage and retrieval unit.

8. The glass cutting line according to claim 3 further including a breaking bar associated with the cassette work piece storage and retrieval unit, wherein the breaking bar is configured to breakout a work piece that is at least partially received within one of the plurality of storage locations of the cassette work piece storage and retrieval unit.

9. The glass cutting line according to claim 8 wherein the cassette work piece storage and retrieval unit has substantially horizontal storage locations and wherein the unit is vertically moveable to align a selected storage location with the cutting table.

10. A glass cutting line comprising:
    a cutting table having a movable cutting head configured to cut glass work pieces on the table, and a conveyor for moving glass work pieces onto and off of the cutting table;
    a tilt loader adjacent the cutting table having a tilt loader table, a tilt loader table conveyor, and a pivoting tilt loader configured to receive and deliver glass work pieces to the tilt loader table whereby the tilt loader table conveyor is configured to transport the glass work pieces to the cutting table; and
    a cassette work piece storage and retrieval unit positioned adjacent to the cutting table, wherein the cassette work piece storage and retrieval unit is configured to receive work pieces directly from the cutting table conveyor and to deliver work pieces directly to the cutting table conveyor from any of a plurality of storage locations.

11. The glass cutting line according to claim 10 further including a breaking bar associated with the cassette work piece storage and retrieval unit, wherein the breaking bar is configured to breakout a work piece that is at least partially received within one of the plurality of storage locations of the cassette work piece storage and retrieval unit.

12. The glass cutting line according to claim 10 wherein the cassette work piece storage and retrieval unit is positioned vertically below the tilt loader table when the tilt loader table is positioned to allow the tilt loader table conveyor to transport the glass work pieces to the cutting table.

13. The glass cutting line according to claim 10 wherein the cassette work piece storage and retrieval unit is configured to receive work pieces from the cutting table and to deliver work pieces to the cutting table from any of a plurality of storage locations simultaneously with the pivoting tilt loader receiving glass work pieces.

14. The glass cutting line according to claim 13 further including a breaking bar associated with the cassette work piece storage and retrieval unit, wherein the breaking bar is configured to breakout a work piece that is at least partially received within one of the plurality of storage locations of the cassette work piece storage and retrieval unit.

15. The glass cutting line according to claim 12 further including a breaking bar associated with the cassette work piece storage and retrieval unit, wherein the breaking bar is configured to breakout a work piece that is at least partially received within one of the plurality of storage locations of the cassette work piece storage and retrieval unit.

16. The glass cutting line according to claim 15 wherein the cassette work piece storage and retrieval unit has substantially horizontal storage locations and wherein the unit is vertically moveable to align a selected storage location with the cutting table.

17. A glass cutting line comprising:
a cutting table having an XY movable cutting head configured to cut glass work pieces on the table, and a cutting table conveyor for moving glass work pieces onto and off of the cutting table;
a cassette work piece storage and retrieval unit adjacent the cutting table and is configured to receive work pieces from the cutting table conveyor and to deliver work pieces to the cutting table conveyor from any of a plurality of storage locations; and
a breaking bar associated with the cassette work piece storage and retrieval unit, wherein the breaking bar is configured to breakout a work piece that is at least partially received within one of the plurality of storage locations of the cassette work piece storage and retrieval unit.

18. The glass cutting line according to claim 17 further including a tilt loader adjacent the cutting table having a tilt loader table, a tilt loader table conveyor, and a pivoting tilt loader configured to receive and deliver glass work pieces to the tilt loader table whereby the tilt loader table conveyor is configured to transport the glass work pieces to the cutting table, and wherein the cassette work piece storage and retrieval unit is positioned vertically below the tilt loader table when the tilt loader table is positioned to allow the tilt loader table conveyer to transport the glass work pieces to the cutting table.

19. The glass cutting line according to claim 18 wherein the cassette work piece storage and retrieval unit is configured to receive work pieces from the cutting table and to deliver work pieces to the cutting table from any of a plurality of storage locations simultaneously with the pivoting tilt loader receiving glass work pieces.

* * * * *